United States Patent [19]

Raes et al.

[11] Patent Number: 4,506,040

[45] Date of Patent: Mar. 19, 1985

[54] PREPARATION OF A STABLE DISPERSION FROM TDI RESIDUE AND ITS USE IN THE PRODUCTION OF POLYURETHANE COMPOSITIONS

[75] Inventors: Maurice C. Raes, Branford; Oliver J. Proulx, Wallingford, both of Conn.

[73] Assignee: Olin Corporation, Cheshire, Conn.

[21] Appl. No.: 518,880

[22] Filed: Aug. 1, 1983

[51] Int. Cl.$^3$ .................. C08G 18/30; C08G 18/14; C08G 18/76; C08G 18/64

[52] U.S. Cl. .................. 521/137; 252/182; 252/188.31; 521/99

[58] Field of Search ............ 521/137; 252/182, 188.31

[56] References Cited

U.S. PATENT DOCUMENTS

| | | | |
|---|---|---|---|
| 3,360,495 | 12/1967 | Muller et al. | 260/33.2 |
| 4,089,835 | 5/1978 | Koenig et al. | 260/31.6 |
| 4,092,275 | 5/1978 | Reischl et al. | 521/137 |
| 4,093,569 | 6/1978 | Reischl et al. | 260/2.5 AM |
| 4,251,401 | 2/1981 | Reischl | 260/9 |
| 4,251,638 | 2/1981 | Reischl | 521/128 |
| 4,293,456 | 10/1981 | Reischl | 260/9 |
| 4,293,470 | 10/1981 | Cuscurida | 260/45.9 R |
| 4,296,213 | 10/1981 | Cuscurida et al. | 521/166 |
| 4,324,716 | 4/1982 | Reischl et al. | 524/761 |
| 4,326,043 | 4/1982 | Narayan et al. | 521/137 |
| 4,359,541 | 11/1982 | Patton et al. | 521/137 |
| 4,359,550 | 11/1982 | Narayan et al. | 524/871 |
| 4,374,209 | 2/1983 | Rowlands et al. | 521/116 |

*Primary Examiner*—Herbert S. Cockeram
*Attorney, Agent, or Firm*—William D. Sabo

[57] ABSTRACT

A stable dispersion is prepared by first forming a dispersion of a polymer derived from TDI residue in an organic solvent, adding a high molecular weight polyol and then removing the solvent to produce a dispersion of the polymer in the high molecular weight polyol. In forming the dispersion in the solvent, TDI residue is reacted with an active hydrogen containing compound selected from the group consisting of an amine compound, a short-chain polyol and mixtures thereof. The stable dispersion is used in preparing a wide variety of polyurethane products, such as foams and elastomers.

42 Claims, No Drawings

PREPARATION OF A STABLE DISPERSION FROM TDI RESIDUE AND ITS USE IN THE PRODUCTION OF POLYURETHANE COMPOSITIONS

This invention relates to a process for preparing a stable dispersion from TDI residue, and to the use of the resulting stable dispersion in the production of various polyurethane products, particularly high resilience and conventional flexible polyurethane foams.

In the art of making polyurethanes, it is known to include in the formulations various polyol systems in order to improve mechanical properties such as strength (e.g. tensile). Polymer-modified polyols are commonly mixed with conventional polyether polyols and the mixtures are used as starting polyol reactants.

One such approach involves the use of so-called "polymer-polyols", which are produced from ethylenically unsaturated monomers and polyols, as exemplified by the disclosures in U.S. Pat. Nos. 3,383,351; 3,652,639 and 3,823,201.

In another technique, the polyol system includes a polyol dispersion formed by reacting an organic polyisocyanate with various polyols and amine compounds in a polyol medium. In U.S. Pat. No. 3,360,495, for example, a dispersion is formed by reacting an organic polyisocyanate with a di (primary hydroxy) alcohol in the presence of a di (secondary hydroxy) alcohol. According to this method, the polyol which serves as the reaction medium must contain exclusively secondary hydroxyl groups to insure that only small amounts may become co-reacted into the polyurethane reaction product and the particles remain insoluble. See also U.S. Pat. No. 4,093,569 in which an organic polyisocyanate is reacted with a selected amine or polyol compound in a hydroxyl group containing compound and at least 4% of water. In carrying out this procedure, it is also necessary to employ as the reaction medium a compound having secondary hydroxyl groups when the compound which is to be reacted with the polyisocyanate has primary hydroxyl groups.

While allowing formation of solid polymeric products directly in the polyol medium, the approaches in these patents impose an undue limitation on the range of isocyanate-reactive compounds and dispersing media polyols that can be selected. Unless the isocyanate-reactive compound has a sufficiently high reactivity, an undesirable degree of reaction may take place between the polyisocyanate and the polyol functioning as the dispersing medium. This can lead to formation of an unstable dispersion or to a dispersion having a viscosity which is so high as to cause processing difficulties in the preparation of polyurethane products. On the other hand, if the reactivity of the isocyanate-reactive compound is too high, this may tend to produce particles which are so large that an unacceptable amount of particle settling occurs. In a co-pending U.S. application filed concurrently herewith, Ser. No. 518,898 there is disclosed a process which seeks to overcome the foregoing problems by preparing a dispersion outside the presence of the desired polyol dispersing medium. This is effectively accomplished by reacting an organic polyisocyanate with an amine compound or a short-chain polyol or a mixture thereof in an organic solvent to form a dispersion of a polymer in the solvent, adding a high molecular weight polyol, and then removing the organic solvent to produce a dispersion of the polymer in the high molecular weight polyol. While this approach has been found to be quite satisfactory, it does present a problem with the overall economics of the process in that it does require the use of relatively expensive organic polyisocyanates and solvents.

Now, it has been discovered, however, that an improvement can be achieved in the process of the above-noted co-pending U.S. application by lowering the overall cost of producing the stable dispersion. In accordance with the present invention, this economic advantage can be accomplished, while still overcoming the problems as discussed above, by employing TDI residue as a starting material in preparing the stable dispersion.

Toluene diisocyanate is produced on a large commercial scale by a process which comprises reacting toluene diamine with excess phosgene usually in the presence of an organic solvent medium. An illustrative process is disclosed in U.S. Pat. No. 3,287,387. Along with toluene diisocyanate, the phosgenation product mixture usually comprises unreacted phosgene, solvent, hydrogen chloride by-product and a relatively substantial proportion of side reaction products in the form of residual and high-boiling materials.

Recovery of a substantial or major proportion of toluene diisocyanate from this mixture is effected by distillation which is usually performed in two or more steps to enable removal of the low-boiling components, e.g., the unreacted phosgene and the solvent, first before recovering the toluene diisocyanate. The remaining residue from distillation is a viscous, fuming mixture which is difficult to transport or process. Thus, on being pumped out for underground burial or incineration, it becomes thicker and thicker presumably as a result of further polymerization. As such, it eventually plugs up the lines making it difficult, if not impossible, to continue the pumping operation. Additionally, because of the toxic fumes emanating therefrom, this residue poses an environmental problem. Thus, in processing it to underground burial, or incineration, or chemical treatment, special and costly steps must be taken to avoid polluting the atmosphere.

The process of the present invention provides an effective means for utilizing an otherwise undesirable product, and achieves this while furnishing a highly desirable stable dispersion for use in the preparation of polyurethane compositions. More in detail, the stable dispersion of the invention is prepared by first reacting TDI residue with an active hydrogen containing compound in an organic solvent to form a dispersion in the solvent. The TDI residue is a residual distilland obtained by distilling toluene diisocyanate from a reaction mixture resulting from phosgenating toluene diamine, and the active hydrogen containing compound is selected from the group consisting of an amine compound, a short-chain polyol and mixtures thereof. This step is followed by adding a selected high molecular weight polyol to the dispersion in the solvent, and then removing the solvent to produce the desired dispersion in the high molecular weight polyol.

The resulting dispersion, which is of relatively low viscosity, can be used directly in the preparation of high resilience or conventional flexible polyurethane foams, or for producing rigid foams or elastomers. Or, if desired, the dispersion is sufficiently stable so that it may be stored for a reasonable period of time prior to use. In any event, the dispersion can be used to obtain polyurethane products, and in particular, foams, featuring desirable strength characteristics.

In preparing the stable dispersion of the invention, the process applies to the use of any residue which results from the distillation of the product of phosgenating toluene diamine. As commonly used in the commercial production of toluene diisocyanate, the toluene diamine is typically made up of a mixture of 2,4- and 2,6-isomers and may in addition contain traces of ortho-toluene diamine. The distillation residue is usually a dark, viscous liquid which is substantially free of solvent. Along with varying amounts of phosgene, by-product hydrochloric acid, and a residual content, of at least about 25% and up to about 60% by weight of toluene diisocyanate, it usually contains a substantial amount, e.g., 25-70% by weight, of high boiling and tarry by-products of the phosgenation reaction.

Under some circumstances, it may be desired to reduce the hydrolyzable chlorine content of the TDI residue, prior to use in preparing the stable dispersion. This can be accomplished by employing a variety of techniques known to those skilled in the art. For example, the TDI residue can be heated to a temperature of about 120° to about 250° C. in the presence of about 0.05% to about 8% by weight, based on the weight of the TDI residue, of formic acid, according to the process of U.S. Pat. No. 3,887,502, the entire disclosure of which is incorporated herein by reference.

Preferably, the TDI residue is dissolved in an organic solvent prior to use in the process of the invention. Any suitable organic solvent in which the TDI residue is soluble can be used for this purpose, such as monochlorobenzene, o-dichlorobenzene, p-dichlorobenzene, cellosolve acetate, acetone and so forth. When so employed, a quantity of solvent is utilized as to lower the viscosity sufficiently at room temperature to facilitate handling in carrying out the process.

As indicated above, the TDI residue is reacted with an active hydrogen containing compound selected from the group consisting of an amine compound, water, a short-chain polyol and a mixture thereof. Any suitable amine compound may be employed including the following: (a) The primary aliphatic amines including mono-, di- and triamines. These amines usually contain 1–8, and preferably 1–4, carbon atoms such as methylamine, ethylamine, n-propylamine, n-butylamine, n-amylamine, n-hexylamine, ethylene diamine, diaminopropane, diaminobutane, pentamethylene diamine, diethylene triamine, and mixtures thereof. Particularly preferred amines in this group are the diamines having 2-4 carbon atoms such as ethylene diamine; (b) The primary aromatic amines including mono-, di- and triamines. Preferably, these contain 6–8 carbon atoms such as aniline, phenylene diamine, toluene diamine and triaminobenzene. A particularly preferred amine in this group is toluene diamine which may be any isomer, such as 2,3-, 2,4- and 2,6-toluene diamine, or a mixture of such isomers; and (c) The alkanolamines, i.e., the aliphatic hydroxy amines. Usually, each alkanol group in these amines contains from 2 to 5 carbon atoms. Illustrative are ethanolamine, diethanolamine, triethanolamine, the mono-, di- and tripropanolamines, ethanolpropanolamine, diethanolpropanolamine, and the mono-, di-, and tributanolamines. Particularly preferred alkanolamines are those in which each alkanol group contains 2-3 carbon atoms such as the ethanolamines, the propanolamines and the ethanolpropanolamines.

The most preferred amines referred to above are selected from the group consisting of ethylene diamine, diaminopropane, toluene diamine, an ethanolamine such as mono-, di-, and triethanolamine, a propanolamine such as mono-, di-, and tripropanolamine, an ethanolpropanolamine such as monoethanolmonopropanolamine and diethanolpropanolamine and mixtures of these amines. In accordance with a particularly preferred embodiment of the invention, there is employed an isomeric mixture of 2,4- and 2,6-toluene diamine in which the weight ratio of the 2,4-isomer to the 2,6-isomer is from about 60:40 to about 90:10, and more preferably, from about 65:35 to about 80:20.

Any suitable short-chain polyol may be used having a molecular weight of about 500 or less and an average functionality of about 2 to about 8. Preferably, the short-chain polyol has a molecular weight from about 62 to about 200 and an average functionality of about 2 to about 4. Suitable short-chain polyols include the following and mixtures thereof: ethylene glycol, 1,2-propylene glycol, 1,3-propylene glycol, 1,4-butylene glycol, 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, glycerol, trimethylolpropane, 1,2,6-hexane triol, trimethylolethane, pentaerythritol, methyl glucoside, quinitol, mannitol, sorbitol, and the like, as well as their ethoxylation and propoxylation products, diethylene glycol, triethylene glycol, tetraethylene glycol, polyethylene glycols, dipropylene glycol, polypropylene glycols, dibutylene glycol, polybutylene glycols, and so forth. Diols and triols are the more preferred short-chain polyol, with ethylene glycol, diethylene glycol, triethylene glycol, 1,4-butane diol, 1,6-hexane diol, glycerol and trimethylolpropane being particularly preferred.

The reaction between the TDI residue and the active hydrogen containing compound is carried out in the presence of a suitable organic solvent. A wide range of solvents may be employed in the process of this invention and, in fact, any inert organic solvent in which the reactants are relatively soluble can be used. Useful solvents include, for example, monochlorobenzene (MCB), o-dichlorobenzene, p-dichlorobenzene, tetrahydronaphthalene, benzene, toluene, xylene, the chlorotoluenes, the trichlorobenzenes, cyclohexane, kerosene, carbon tetrachloride, trichloroethylene, etc.

According to the process of the invention, the TDI residue and the active hydrogen containing compound are reacted to form a dispersion of a polymer in the organic solvent. In general, the TDI residue and the active hydrogen containing compound are employed in an equivalent ratio of NCO to active hydrogen ranging from about 0.5 to about 1.5, preferably from about 0.8 to about 1.2, and more preferably from about 0.95 to about 1.0. If higher proportions of TDI residue are employed, there is a substantial increase in viscosity when the high molecular weight polyol is added as described below and rapid gellation tends to occur. As the quantity of TDI residue is reduced to a level which is too low, little or no particle formation generally results.

Generally, the reaction is further carried out employing such relative proportions as to achieve a TDI residue/active hydrogen containing compound reaction product which ranges from about 5% to about 50% by weight based on the total weight of the TDI residue, the active hydrogen containing compound and the organic solvent. Preferably, however, the reaction product or solid particles content of the dispersion in the organic solvent varies from about 20% to about 30% by weight. If the relative proportions of the components are such as to provide a reaction product content in the dispersion of less than about 5%, a solution with insufficient particle formation will generally be obtained. On the other hand, the use of relative proportions, which would yield a reaction product content in excess of the upper level of about 50%, will likely lead to development of an unacceptably high exotherm during the course of the reaction.

Common urethane catalysts, e.g., tertiary amines and metal compounds such as stannous octoate, dibutyltin dilaurate or dibutyl di (lauryl mercapto) tin may be used to accelerate the reaction. The use of tertiary amines has the additional advantage of reducing the content of hydrochloric acid which may be present in the reaction mixture. The reaction temperature and time will both depend upon many factors. Generally, however, a reaction temperature from about 20° to about 80° C. and a reaction time from about 1 minute to about 2 hours are employed. Preferably, the reaction temperature is within the range from about 50° to about 70° C. It is also preferred to carry out the reaction under conditions of high-shear mixing. This can be performed by adding the TDI residue to a mixture of the active hydrogen containing compound and the organic solvent, which is being stirred at a very rapid rate.

Next, the high molecular weight polyol is added to the dispersion in the organic solvent. The high molecular weight polyol which is employed is selected from polyether polyols and polyester polyols and mixtures of two or more such polyols. The high molecular weight polyol, or mixture thereof, should have an average molecular weight ranging from about 100 to about 10,000. Preferably, the average molecular weight is about 500 to about 5,000. The average functionality of the high molecular weight polyol or polyol blend is usually about 2 to about 8, preferably about 2 to about 4, and more preferably about 2 to about 3.

Polyether polyols are the preferred high molecular weight polyol. Suitable polyether polyols include various polyoxyalkylene polyols and mixtures thereof. These can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiator used in preparing the polyether polyol includes the following and mixtures thereof: (a) the aliphatic diols, such as ethylene glycol, 1,2-propylene glycol, 1,3-propylene glycol, butylene glycols, butane diols, pentane diols and the like; (b) the aliphatic triols, such as glycerol, trimethylolpropane, triethylolpropane, trimethylolhexane and the like; (c) higher functionality alcohols, such as pentaerythritol, methyl glucoside, sorbitol and the like; (d) the polyamines, such as diethylene triamine; and (e) the alkanolamines, such as diethanolamine, triethanolamine and the like.

A preferred group of polyhydric initiators for use in preparing the polyether polyol is one which comprises aliphatic diols and triols such as ethylene glycol, 1,2-propylene glycol, 1,3-propylene glycol, glycerol, trimethylolpropane and the like.

The alkylene oxide-polyhydric initiator condensation reaction is preferably carried out in the presence of a catalyst such as KOH as is well known in the art. In effecting the reaction, a sufficient proportion of alkylene oxide is used as to provide a final polyol product having an average molecular weight of about 100 to about 10,000, preferably about 500 to about 5,000, and more preferably about 3,000 to about 5,000. The catalyst is thereafter preferably removed, leaving a polyether polyol which is ready for use according to the process of the invention.

Suitable polyester polyols include the products of reacting polycarboxylic acids with polyhydric alcohols, prepared in accordance with procedures well known in the art. Illustrative polycarboxylic acids include, for example, oxalic, malonic, succinic, glutaric, adipic, pimelic, suberic, azelaic, phthalic and isophthalic acids, mixtures thereof, and the like. Illustrative polyhydric alcohols include various diols, triols, tetrols and higher functionality alcohols, such as ethylene glycol, diethylene glycol, 1,2-propylene glycol, 1,3-propylene glycol, butylene glycols, butane diols, pentane diols, glycerol, trimethylolpropane, trimethylolhexane, hexane 1,2,6-triol, pentaerythritol, methyl glucoside, sorbitol, mixtures thereof, and the like.

Generally, the high molecular weight polyol is used in a proportion such that the TDI residue/active hydrogen containing compound reaction product constitutes from about 1% to about 40% by weight based on the total weight of the TDI residue, the active hydrogen containing compound and the high molecular weight polyol. Preferably, however, the reaction product content will range from about 2% to about 20% by weight.

After the high molecular weight polyol is added to the dispersion in the organic solvent and the mixture blended, the organic solvent is then removed. Any suitable method for removing the solvent known to those skilled in the art, such as stripping or spray drying, may be employed. It is also preferred to neutralize any residual hydrochloric acid in the dispersion product. For this purpose, any suitable inorganic or organic base may be used, such as sodium hydroxide, potassium hydroxide, calcium oxide, tertiary monoamines or polyamines, etc. The resulting dispersion in the high molecular weight polyol may then be employed in the preparation of polyurethane products in accordance with techniques well known to those skilled in the art. Properties can be varied to form polyurethane products such as elastic fibers, elastomers, or high resilience, conventional flexible, semi-rigid or rigid foams.

The polyurethane products are prepared by reacting any suitable combination of an organic polyisocyanate, a stable dispersion of the invention and optionally an additional polyol, in the presence of a catalyst for the reaction. When the polyurethane to be produced is a foam, the reaction mixture further includes a foaming agent and usually a foam stabilizing agent. In the preparation of the polyurethane compositions, either of the general polyurethane forming processes, the "one-shot" or the "prepolymer" processes, may be utilized.

In preparing the polyurethane products of the invention, any suitable organic polyisocyanate, or mixture of polyisocyantes, may be used including toluene diisocyanate, such as the 80:20 and the 65:35 mixtures of the 2,4- and 2,6-isomeric forms, ethylene diisocyanate, propylene diisocyanate, methylene-bis-(4-phenyl isocyanate), methylene-bis (4-cyclohexyl) isocyanate, xylene diisocyanate, 3,3'-bitoluene-4,4'diisocyanate, hexamethylene diisocyanate, napthalene 1,5-diisocyanate, isophorone diisocyanate, the polymeric isocyanates such as polyphenylene polymethylene isocyanate, and the like and mixtures thereof. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably, from about 65:35 to about 80:20. In practice, the organic polyisocyanate is usually used in a proportion to provide no more than about 1.25 NCO groups per each hydroxy group. A 100 multiple of the ratio of NCO to OH groups in the reaction system is referred to as the "index".

Under some circumstances, it may be preferred to include an additional polyol in the foam-forming reaction mixture. To facilitate handling, the additional polyol may be added to the stable dispersion prior to its inclusion in the foam formulation. When so employed, the additional polyol may be any of the high molecular weight polyols set forth above as being useful in the preparation of the stable dispersion. The amount of polyol added is generally such that the resulting diluted dispersion will contain a solid particles content ranging from about 2% to about 20% by weight based on the weight of the total polyol.

The catalyst employed in preparing the polyurethane compositions of the invention may be any of the catalysts known to be useful for this purpose. Depending upon the type of product desired, the catalyst may include, for example, a tertiary amine, an organo-metallic salt, a mixture of an organo-metallic salt with one or more tertiary amine, etc. Typical tertiary amines include, for example, triethylamine, triethylene diamine, trimethylamine, tetramethylene diamine, tetramethylbutane diamine, N-methylmorpholine, N-ethylmorpholine, dimethylpiperazine, trimethylaminoethylpiperazine, dimethylcyclohexylamine, mixtures of bis(dimethylaminoethylether) and dipropylene glycol such as the 7:3 weight ratio mixture which is available commercially under the trademark "Niax A-1", methyldicyclohexylamine, N-cyclohexylmorpholine, dimethylcyclohexylamine, methyldiethanolamine, mixtures of dimethylcyclohexylamine and 2-(3-pentyl)-1dimethylaminocyclohexane such as may be purchased commercially under the trademark "Polycat", bis(dimethylaminoethylpropylether), mixtures of triethylene diamine and dipropylene glycol such as the 1:2 and 1:4 weight ratio mixtures which may be purchased commercially under the trademarks "Dabco 33LV", and "Dabco 8020", respectively, bis(dimethylaminopropylether) and mixtures of these catalysts. The preferred tertiary amine catalysts are triethylene diamine, mixtures of triethylene diamine with dipropylene glycol, mixtures of bis(dimethylaminoethylether) and dipropylene glycol, dimethylcyclohexylamine alone or as a mixture thereof with 2-(3-pentyl)-1-dimethylaminocyclohexane. The tertiary amine catalyst is used in a proportion of about 0.1-1.5, and preferably about 0.25-0.75, parts per 100 parts by weight of the total polyol which is employed in preparing the polyurethane.

Typical organometallic salts include, for example, the salts of tin, mercury, titanium, antimony, aluminum, cobalt, zinc, bismuth, lead, and cadmium, the tin salts, i.e., stannic and stannous salts, being preferred. Illustratively, such salts include the octoates, dilaurates, diacetates, dioctoates, oleates, and neodecanoates of these metals, the octoates being preferred. The organo-metallic salt catalyst is used in a proportion of about 0–1.0, and preferably about 0.01–0.5, parts per 100 parts by weight of the total polyol which is employed in the preparation of the polyurethane.

When the product being formed is a polyurethane foam, this may be accomplished by employing a small amount of a conventional polyurethane foaming agent. Any suitable foaming agent, or mixture of foaming agents, may be employed. These include inorganic foaming agents, such as water, and organic foaming agents containing up to 7 carbon atoms, such as the halogenated hydrocarbons and the low molecular weight alkanes, alkenes and ethers. Illustrative organic foaming agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether, diisopropyl ether, mixtures thereof and the like. Water and the low molecular weight polyhalogenated alkanes, such as monofluorotrichloromethane, dichlorodifluoromethane and methylene chloride, are preferred. The amount of foaming agent can be varied over a wide range, as is known to those skilled in the art. Generally, however, the halogenated alkanes, for example, are employed in an amount of about 2–20 parts per 100 parts by weight of the total polyol; and water is employed in an amount of about 1–6 parts per 100 parts by weight of the total polyol.

It is preferred in the preparation of the polyurethane foams of the invention to employ minor amounts of a conventional surfactant in order to further improve the cell structure of the polyurethane foam. suitable such surfactants include, for example, the silicon-based surfactants such as the silicones and the siloxane-oxyalkylene block copolymers, all of which are commercially available materials. Generally, the silicones are employed in a proportion of up to about 0.1 parts per 100 parts by weight of the total polyol; and the siloxane-oxyalkylene block copolymers are employed in a proportion of up to about 2 parts per 100 parts by weight of the total polyol.

The polyurethane formulations may also include various other additives and ingredients known to those skilled in the art. For example, to provide different properties in the polyurethane foam products, fillers such as clay, calcium sulfate or ammonium phosphate may be added to lower cost and improve physical properties. Ingredients such as dyes may be added for color, and fibrous glass, asbestos or synthetic fibers may be added for strength. In addition, plasticizers, deodorants, antioxidants and flame retardants may be added.

The following examples are provided to illustrate the invention. The toluene diisocyanate distillation residue which is referred to and used throughout the examples was obtained by a conventional method, as described, for example, in U.S. Pat. No. 3,287,387, for the commercial production of toluene diisocyanate. More specifically, this method involves (a) reacting, at about 125° C., excess phosgene with a solution of toluene diamine (mixture of 2,4- and 2,6-isomers) in monochlorobenzene (MCB) solvent, (b) removing the MCB, and most of the unreacted phosgene and by-product HCl from the phosgenation product, and (c) further distilling the remaining product to recover overhead pure toluene diisocyanate. The residue from this distillation, which contains about 30% by weight of residual toluene diisocyanate, is used in the examples.

Further in the examples, all parts and percentages are by weight unless otherwise specified.

Equipment

In carrying out Examples 1–4 described below, a specially equipped Waring blender was employed. The specific apparatus is commercially available from Lab Glass, Inc., Vineland, N.J., under the designation "LG-3350" and is described in "Catalog 100 - Scientific Glassware and Research Apparatus". This blender-reactor was modified by using a high-shear rotor-stator assembly, consisting of a three-bladed rotor running within an eight-slotted stator. The assembly is commercially available from VWR Scientific Inc., under the designation "Model BEW-5" as shown in "Scientific Apparatus - Catalog 80".

In general, the blender-reactor includes a glass vessel, having a diameter of 3 inches and a height of 10 inches, the vessel being enclosed within a glass mantle. In the bottom of the vessel is a channel suitably sized to accommodate the shaft of the blender motor. The vessel is also provided with a cover having a series of necks adapted to receive accessories.

In the following Examples 1–4, there was employed a blender motor having 7 speeds, capable of developing 870 watts; speeds, without load, could range from 10,000 to 24,000 rpm. The neck openings in the cover were provided with a thermometer, a reflux condenser surmounted with a flowmeter, a stirrer and a 3-inch Teflon blade for directing liquids downwardly towards an emulsifying blade. Just above the emulsifying blade, the vessel was provided with an inlet through which diisocyanate was pumped. For this purpose, there was used a metering pump, adjustable between 4 and 40 cc/min. In operation, water was pumped through the mantle at a temperature of 60°–70° C. and at a rate of 55 cc/min.

EXAMPLE 1

A total of 32.6 grams of toluene diamine[1] (TDA) was dissolved in 250 grams of MCB at 80° C. About 70% of this solution was poured into the blender. Then, a solution was made of 52.3 grams of TDI residue in 104.6 grams of MCB, and the resulting solution was filtered.

[1]This is a mixture of toluene diamine isomers (80:20 mixture of 2,4/2,6-isomers).

The TDA solution was kept at 70° C. with the mantle temperature at 80° C. and the TDI residue solution was pumped into the blender during a 6-minute interval, while the blender motor was kept at high speed. The temperature rose to 100° C. An IR analysis showed a substantial amount of unreacted NCO. The remaining 30% of the TDA solution was poured into the blender, while stirring at high speed for 5 minutes. An IR scan showed only a small percentage of unreacted NCO and carbodiimides. An excess of 65% TDA over the required theoretical amount was used.

After removing 30 grams of material for samples, 285 grams of a polyether polyol[2] was added, while stirring at high speed for 3 minutes. the MCB was then stripped off in a rotary evaporator at 120° C. and 1 mm Hg. A total weight of 361 grams was obtained of a dispersion in the polyether polyol containing a solids content of 20%. To this dispersion, 1,444 grams of additional polyether polyol was added to reduce the solids content to 4%. The resulting diluted dispersion had a viscosity of 970 cps and a particle size below 5 microns.[3] The particle size was also measured by microscope to be between 1–3 microns. The pH of the dispersion was 5.0.

[2]This is a triol having a molecular weight of about 4,800 and prepared by oxypropylating glycerin, then oxyethylating to a final hydroxyl number of about 35.

[3]The particle size was measured by using a "Fineness-of-Grind Gauge", as described in ASTM D1210-64 (1970).

EXAMPLE 2

The equipment as described above was used, except that the heating mantle was kept empty at 25° C. The blender was filled with 235 grams of MCB, 9 grams of triethylamine and 15 grams of water. The blender motor was turned on to high speed and 150 grams of a 33.3% solution of TDI residue in MCB was pumped into the blender during a 4-minute interval. The temperature rose from 30° to 90° C. Formation of $CO_2$ as a result of the diisocyanate-water reaction was measured using a Matheson Flowmeter No. 603. The flow of $CO_2$ started at 0.05 l/minute, rose to 1.30 l/minute after 3 minutes and then slowed to 0.30 l/minute after 5½ minutes. An IR scan showed no NCO or carbodiimide absorptions. Then, 296 grams of a polyether polyol[1] was poured into the blender and mixed thoroughly, and the MCB was stripped off as described in Example 1. A total of 346 grams was obtained of a dispersion in the polyether polyol containing a solids contents of 20%. The dispersion was diluted to a solids content of 4% by the addition of additional polyether polyol. The final dispersion product weighed 1,037 grams, and it had a viscosity of 1,370 cps and a pH of 5.4.

[1]This is a triol having a molecular weight of about 4,800 and prepared by oxypropylating glycerin, then oxyethylating to a final hydroxyl number of about 35.

EXAMPLE 3

The blender was filled with 200 grams of MCB, 15 grams of water and 11.25 grams of formic acid. The water in the mantle was heated to 80° C. The blender motor was turned on to high speed and 150 grams of a 33.3% solution of TDI residue in MCB was pumped into the blender during a 4-minute interval. The temperature increased from 60° to 92° C. after 9 minutes. Formation of $CO_2$ as a result of the diisocyanate-water reaction was measured using a Matheson Flowmeter No. 603. The flow in $CO_2$ was 0.3 l/minute at the start, 0.8 l/minute after 5 minutes and 0.3 l/minute after 9 minutes. An IR scan showed no NCO or carbodiimide absorptions. Then, 170 grams of a polyether polyol[1] was mixed in and the MCB was stripped off as described in Example 1. The resulting dispersion had a viscosity of 1,100 cps and a solids content of 15%. The pH of the dispersion was 3.7, and the pH was corrected to neutral by adding 0.22 grams of triethylamine per 100 grams of polyether polyol. The dispersion was diluted to a solids content of 10% by the addition of additional polyether polyol.

[1]This is a triol having a molecular weight of about 3,000 and prepared by oxypropylating glycerin to a final hydroxyl number of about 56.

EXAMPLE 4

The temperature of the water in the mantle was kept at 40° C. A solution of 9.2 grams of ethylene glycol in 200 grams of MCB was added to the blender. The blender motor was turned on to high speed and 150 grams of a 33.3% solution of TDI residue in MCB was pumped into the blender during a 4-minute interval, followed by 10 grams of water and 7 grams of triethylamine. The final temperature was 72° C. An IR analysis showed no NCO or carbodiimide absorptions after 1½ hours at 80°C. At that time, 230 grams of a off as described in Example 1. A dispersion in the polyether polyol was obtained having a solids content of 20% and a pH of 4.7. The dispersion was diluted to a solids content of 4% by the addition of additional polyether polyol. The diluted dispersion had a viscosity of 1,100 cps. ≢

$^1$This is a triol having a molecular weight of about 4,800 and prepared by oxypropylating glycerin, then oxyethylating to a final hydroxyl number of about 35.

EXAMPLES 5, 6 and 7

Free-rise flexible foams were prepared from the mixtures set forth in Table I, employing the dispersions of Examples 1, 2 and 3, respectively. High resilience foams were produced in Examples 5 and 6 (note the Sag Factors in excess of 2.5) and a conventional foam in Example 7 (as evidenced by a Sag Factor of 2.09). In each example, the ingredients were hand-mixed and allowed to foam in a square cardboard box, in accordance with standard procedures known to those skilled in the art. The physical properties of the foams are also shown in Table I.

TABLE I
FOAM FORMULATION AND PROPERTIES

| | Example No. | | |
|---|---|---|---|
| | 5 | 6 | 7 |
| Dispersion | Example 1 | Example 2 | Example 3 |
| Dispersion Weight, grams | 100 | 100 | 50 |
| Polyether Polyol 1 | — | — | 50 |
| Water, grams | 1.8 | 1.8 | 4.0 |
| Triethylene Diamine 2, grams | 0.3 | — | 0.25 |
| Catalyst 3, grams | — | — | 0.25 |
| Catalyst 4, grams | 0.4 | 0.3 | — |
| Diethanolamine, grams | 0.8 | 0.8 | — |
| Surfactant 5, grams | 1.0 | 1.0 | — |
| Surfactant 6, grams | | | 1.0 |
| Toluene Diisocyanate, grams | 23.5 | 23.5 | 49.7 |
| Toluene Diisocyanate, index | 115 | 115 | 105 |
| Foam Density, pcf | 2.80 | 2.71 | 1.79 |
| Indentation Load Deflection | | | |
| @ 25% | 23 | — | — |
| @ 65% | 55 | — | — |
| Compression Deflection | | | |
| @ 25% | 0.27 | 0.33 | 0.52 |
| @ 65% | 0.69 | 0.83 | 1.09 |
| Sag Factor | 2.53 | 2.50 | 2.09 |
| Tensile Strength, psi | 14.8 | 13.1 | 10.8 |
| Elongation, % | 196 | 125 | 150 |
| Tear Strength, pli | 1.53 | 1.52 | 1.17 |
| Ball Rebound, % | 61 | — | — |

TABLE I-continued
FOAM FORMULATION AND PROPERTIES

| | Example No. | | |
|---|---|---|---|
| | 5 | 6 | 7 |
| Air Flow, cfm | 2.88 | 2.3 | — |

1 This is a triol having a molecular weight of about 3,000 and prepared by oxypropylating glycerin to a final hydroxyl number of about 56.
2 This is commercially available under the trademark "DABCO 33LV", consisting primarily of triethylene diamine (⅓) and dipropylene glycol (⅔).
3 This is a stannous ocotate and is commercially available from Witco Chemical Corporation under the designation "C-2".
4 This is a dibutyltin dilaurate and is a commercial product of M & T Chemicals Corporation purchased under the designation "T-12".
5 This is a siloxane-oxyalkylene block copolymer and is commercially available from Dow Corning under the designation "Q2-5043".
6 This is a siloxane-oxyalkylene block copolymer and is commercially available from Dow Corning under the designation "DC-190".

What is claimed is:

1. A process for preparing a stable dispersion of a polymer in a high molecular weight polyol comprising the steps of:
   (a) reacting TDI residue with an active hydrogen containing compound in an organic solvent and outside the presence of said high molecular weight polyol to form a dispersion of a polymer in said organic solvent, said TDI residue being a residual distilland obtained by distilling toluene diisocyanate from a reaction mixture resulting from phosgenating toluene diamine, and said active hydrogen containing compound being selected from the group consisting of water a short-chain polyol and mixtures thereof;
   (b) adding said high molecular weight polyol to said dispersion in said organic solvent; and
   (c) removing said organic solvent to produce a dispersion of said polymer in said high molecular weight polyol.

2. The process of claim 1, wherein said TDI residue and said active hydrogen containing compound are employed in an equivalent ratio of NCO to active hydrogen ranging from about 0.5 to about 1.5.

3. The process of claim 2, wherein the TDI residue/active hydrogen containing compound reaction product constitutes from about 5% to about 50% by weight based on the total weight of said TDI residue, said active hydrogen containing compound and said organic solvent in said dispersion in said organic solvent prior to addition of said high molecular weight polyol.

4. The process of claim 3, wherein the TDI residue/active hydrogen containing compound reaction product constitutes from about 1% to about 40% by weight based on the total weight of said TDI residue, said active hydrogen containing compound and said high molecular weight polyol in said stable dispersion.

5. The process of claim 1, wherein said short-chain polyol has an average molecular weight of about 62 to about 200 and an average functionality of about 2 to about 4.

6. The process of claim 1, wherein said high molecular weight polyol has an average molecular weight of about 500 to about 5,000 and an average functionality of about 2 to about 4.

7. The process of claim 1, wherein said organic solvent is monochlorobenzene.

8. The process of claim 1, wherein said TDI residue is dissolved in an organic solvent prior to reaction with said active hydrogen containing compound.

9. The process of claim 1, wherein said TDI residue has an NCO content of at least about 25% by weight.

10. The process of claim 1, wherein said TDI residue and said active hydrogen containing compound are employed in an equivalent ratio of NCO to active hydrogen ranging from about 0.8 to about 1.2.

11. The process of claim 10, wherein the TDI residue/active hydrogen containing compound reaction product constitutes from about 20% to about 30% by weight based on the total weight of said TDI residue, said active hydrogen containing compound and said organic solvent in said dispersion in said organic solvent prior to addition of said high molecular weight polyol; and wherein the TDI residue/active hydrogen containing compound reaction product constitutes from about 2% to about 20% by weight based on the total weight of said TDI residue, said active hydrogen containing compound and said high molecular weight polyol in said stable dispersion.

12. The process of claim 11, wherein said active hydrogen containing compound is selected from the group consisting of water, ethylene glycol, diethylene glycol, triethylene glycol, 1,4-butane diol, 1,6-hexane diol, glycerol and trimethylolpropane.

13. The process of claim 12, wherein said high molecular weight polyol has an average molecular weight of about 3,000 to about 5,000 and is an oxypropylated or an oxypropylated, then oxyethylated aliphatic triol.

14. The process of claim 13, wherein said organic solvent is monochlorobenzene and said TDI residue is dissolved in an organic solvent prior to reaction with said active hydrogen containing compound.

15. The process of claim 14, wherein said TDI residue has an NCO content of at least about 25% by weight.

16. A dispersion prepared according to the process of claim 1.

17. A dispersion prepared according to the process of claim 4.

18. A dispersion prepared according to the process of claim 11.

19. A dispersion prepared acording to the process of claim 15.

20. In a process for preparing a polyurethane foam from a reaction mixture comprised of a polyol reactant, an organic polyisocyanate, a foaming agent and a reaction catalyst, the improvement of including in said reaction mixture a stable dispersion of a polymer in a high molecular weight polyol, said stable dispersion being prepared by:
(a) reacting TDI residue with an active hydrogen containing compound in an organic solvent and outside the presence of said high molecular weight polyol to form a dispersion of a polymer in said organic solvent, said TDI residue being a residual distilland obtained by distilling toluene diisocyanate from a reaction mixture resulting from phosgenating toluene diamine, and said active hydrogen containing compound being selected from the group consisting of water a short-chain polyol and mixtures thereof;
(b) adding said high molecular weight polyol to said dispersion in said organic solvent; and
(c) removing said organic solvent to produce a dispersion of said polymer in said high molecular weight polyol.

21. The process of claim 20, wherein said TDI residue and said active hydrogen containing compound are employed in an equivalent ratio of NCO to active hydrogen ranging from about 0.5 to about 1.5.

22. The process of claim 21, wherein the TDI residue/active hydrogen containing compound reaction product constitutes from about 5% to about 50% by weight based on the total weight of said TDI residue, said active hydrogen containing compound and said organic solvent in said dispersion in said organic solvent prior to addition of said high molecular weight polyol.

23. The process of claim 22, wherein the TDI residue/active hydrogen containing compound reaction product constitutes from about 1% to about 40% by weight based on the total weight of said TDI residue, said active hydrogen containing compound and said high molecular weight polyol in said stable dispersion.

24. The process of claim 20, wherein said short-chain polyol has an average molecular weight of about 62 to about 200 and an average functionality of about 2 to about 4.

25. p The process of claim 20, wherein said high molecular weight polyol has an average molecular weight of about 500 to about 5,000 and an average functionality of about 2 to about 4.

26. The process of claim 20, wherein said organic solvent is monochlorobenzene.

27. The process of claim 20, wherein said TDI residue is dissolved in an organic solvent prior to reaction with said active hydrogen containing compound.

28. The process of claim 20, wherein said TDI residue has an NCO content of at least about 25% by weight.

29. The process of claim 20, wherein said TDI residue and said active hydrogen containing compound are employed in an equivalent ratio of NCO to active hydrogen ranging from about 0.8 to about 1.2.

30. The process of claim 29 wherein the TDI residue/active hydrogen containing compound reaction product constitutes from about 20% to about 30% by weight based on the total weight of said TDI residue, said active hydrogen containing compound and said organic solvent in said dispersion in said organic solvent prior to addition of said high molecular weight polyol; and wherein the TDI residue/active hydrogen containing compound reaction product constitutes from about 2% to about 20% by weight based on the total weight of said TDI residue, said active hydrogen containing compound and said high molecular weight polyol in said stable dispersion.

31. The process of claim 30, wherein said active hydrogen containing compound is selected from the group consisting of water, ethylene glycol, diethylene glycol, triethylene glycol, 1,4-butane diol, 1,6-hexane diol, glycerol and trimethylolpropane.

32. The process of claim 30, wherein said high molecular weight polyol has an average molecular weight of about 3,000 to about 5,000 and is an oxypropylated or an oxypropylated, then oxyethylated aliphatic triol.

33. The process of claim 32, wherein said organic solvent is monochlorobenzene and said TDI residue is dissolved in an organic solvent prior to reaction with said active hydrogen containing compound.

34. The process of claim 33, wherein said TDI residue has an NCO content of at least about 25% by weight.

35. A polyurethane foam prepared according to the process of claim 20.

36. A polyurethane foam prepared according to the process of claim 23.

37. A polyurethane foam prepared according to the process of claim 30.

38. A polyurethane foam prepared according to the process of claim 34.

39. In a process for preparing a polyurethane composition from a reaction mixture comprising a polyol reactant, an organic polyisocyanate and a reaction catalyst, the improvement wherein said polyol reactant comprises a stable dispersion of a polymer in a high molecular weight polyol prepared according to the process of claim 1.

40. In a process for preparing a polyurethane composition from a reaction mixture comprising a polyol reactant, an organic polyisocyanate and a reaction catalyst, the improvement wherein said polyol reactant comprises a stable dispersion of a polymer in a high molecular weight polyol prepared according to the process of claim 15.

41. A polyurethane composition prepared according to the process of claim 39.

42. A polyurethane composition prepared according to the process of claim 40.

* * * * *

UNITED STATES PATENT AND TRADEMARK OFFICE
CERTIFICATE OF CORRECTION

PATENT NO. : 4,506,040

DATED : March 19, 1985

INVENTOR(S) : Maurice C. Raes and Oliver J. Proulx

It is certified that error appears in the above-identified patent and that said Letters Patent is hereby corrected as shown below:

Column 1, line 58, after "occurs." insert indentation for new paragraph.

Column 8, line 36, capitalize the word "suitable".

Column 10, line 33, change "contents" to --content--.

Column 10, line 53, insert a space after "0.8".

Column 11, line 13, after "of a" insert --polyether polyol$^1$ was added and the MCB was stripped--.

Column 11, line 20, delete "$\neq$".

Column 11, line 58, delete underscoring of "Indentation Load Deflection".

Column 11, line 61, delete underscoring of "Compression Deflection".

Column 12, line 10, delete "ocotate" and insert --octoate--.

Column 13, line 40, delete "acording" and insert --according--.

Column 14, line 18, after the number "25." delete --p--.

Signed and Sealed this

Second Day of September 1986

[SEAL]

Attest:

DONALD J. QUIGG

Attesting Officer     Commissioner of Patents and Trademarks